United States Patent [19]
Hand

[11] 3,738,676
[45] June 12, 1973

[54] SLED SKI

[76] Inventor: Albert E. Hand, 320 Camp Street, Plainville, Conn. 06062

[22] Filed: Dec. 30, 1968

[21] Appl. No.: 787,830

[52] U.S. Cl. .................................... 280/22, 280/28
[51] Int. Cl. ........................................... B62b 17/02
[58] Field of Search .................... 280/21 A, 28, 22, 280/16

[56] References Cited
UNITED STATES PATENTS
1,303,388   5/1919   Reach .............................. 280/21.1
2,532,887   12/1950  Bor ................................. 280/21.1
2,824,746   2/1958   Schummer .......................... 280/28
3,578,351   5/1971   McAtee ............................. 280/28

*Primary Examiner*—Benjamin Hersh
*Assistant Examiner*—Robert R. Song
*Attorney*—Louis V. Lucia

[57] ABSTRACT

A sled ski which can be easily attached to the flexible runners of conventional sleds for use on snow and which will permit flexing of the runners for steering. Said ski being also adapted to bank with the steering of the sled.

4 Claims, 11 Drawing Figures

INVENTOR.
ALBERT E. HAND.
BY Louis V. Lucia
ATTORNEY.

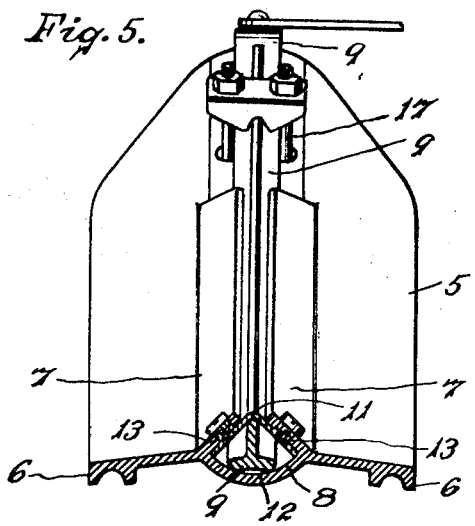
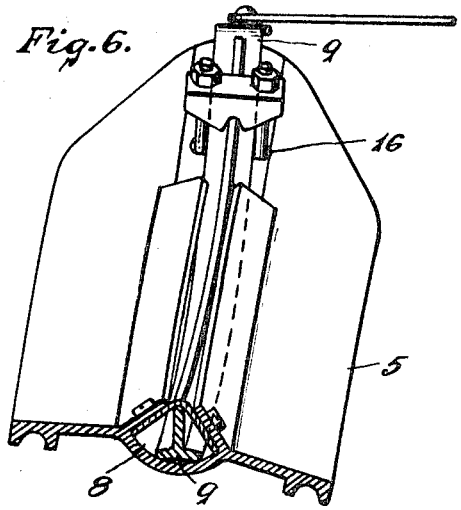
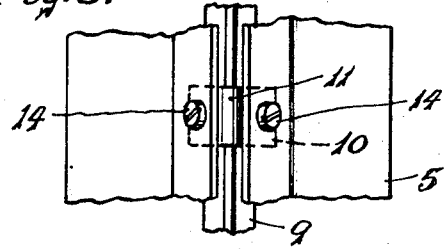
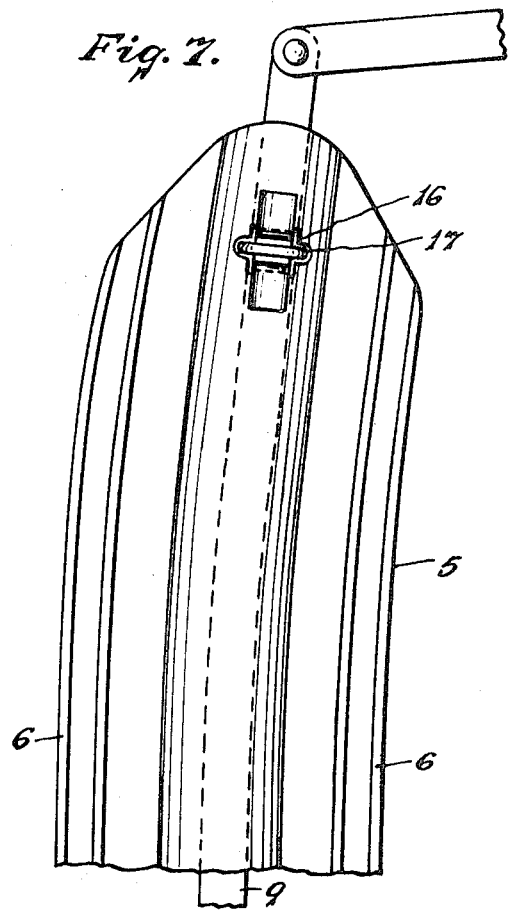
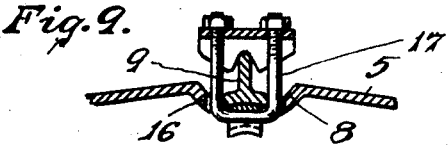
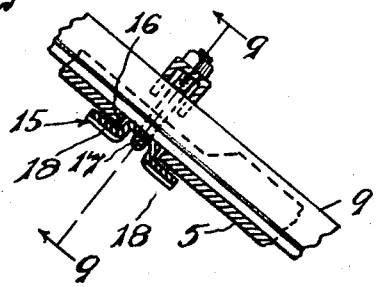
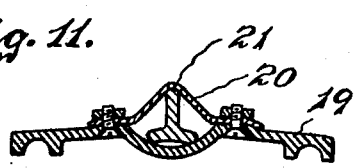
INVENTOR.
ALBERT E. HAND.
BY Louis V. Lucia.
ATTORNEY.

SLED SKI

BACKGROUND OF THE INVENTION

Known sled skis are attached to the runners of sleds in such a manner that they interfere with the flexing of the runners for steering and it is highly desirable that such skis shall permit movement of the runners upon the skis so that they may flex as the sled is steered.

SUMMARY OF THE INVENTION

In accordance with the present invention, a sled ski is provided with means for fastening it to the sled runner in a manner which will not interfere with the flexing of the runner for steering the sled.

The general object of the invention is to provide a connection between the ski and the runner which will allow the runner to flex upon the ski.

A further object is to provide a pivotal connection which will cause the ski to bank in the direction in which the sled is steered as the runner is flexed.

BRIEF DESCRIPTION OF THE DRAWING

FIG. 5 is a sectional rear view of a portion of the sled on line 5—5 of FIG. 2.

FIG. 6 is a rear view of said portion showing the runner and ski in a steering position.

FIG. 7 is a bottom view thereof.

FIG. 8 is a plan view showing the fastening means for the main portion of the ski.

FIG. 9 is a sectional view on line 9—9 of FIG. 10.

FIG. 10 is a sectional side view of a portion of the sled showing the anchoring means for the front end portion of the ski.

FIG. 11 is a sectional rear view of a modified form of ski and fastening means for the main portion of the ski.

DESCRIPTION OF THE INVENTION

Figure 1:
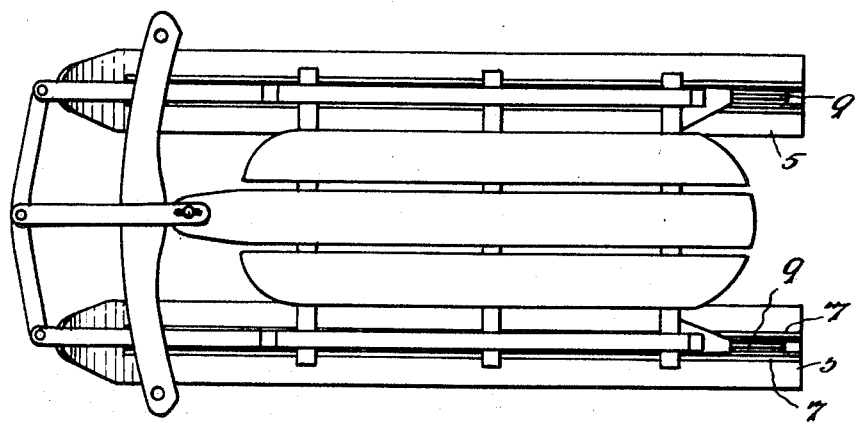
FIG. 1 is a plan view of a sled showing my improved skis attached thereto.
Figure 2:
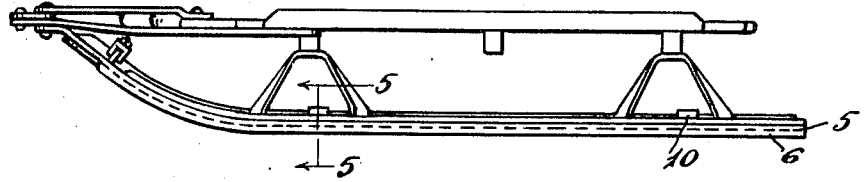
FIG. 2 is a side view thereof.
Figure 3:
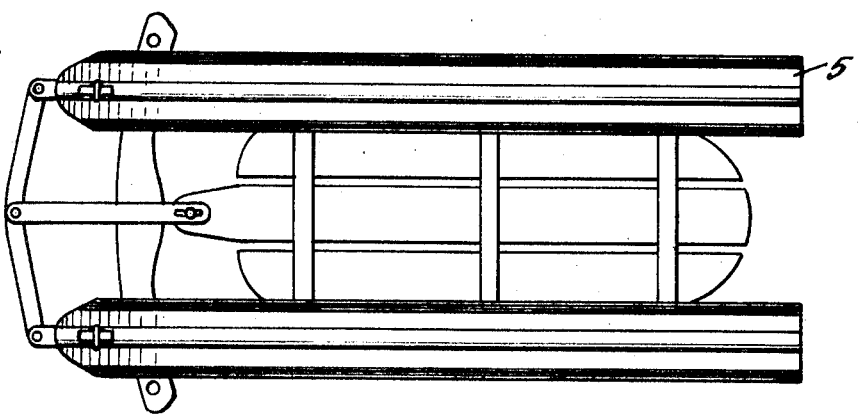
FIG. 3 is a bottom view thereof.
Figure 4:
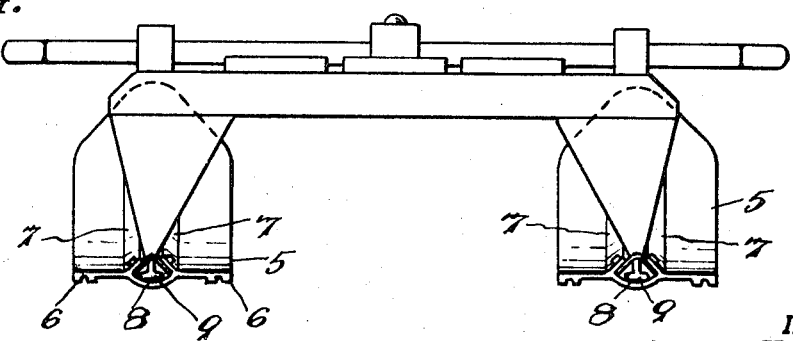
FIG. 4 is an enlarged rear view of said sled.

As shown in the drawings, my improved sled ski, indicated by the numeral 5, is preferably constructed from a strip of a suitable extruded plastic material and has side flanges 6—6 projecting downwardly from the bottom thereof to prevent sidewise skidding. The upper side of said ski has a pair of spaced parallel flanges 7—7 angled toward each other to form an undercut axial groove 8 between them to receive the flexible runner 9 of the sled which is commonly of inverted T shape.

The said ski is fastened to the runner by means of angular straps 10 which fit within the groove 8 against the undersides of the flanges 7—7 and have an apex 11 that engages the top edge of the runner to retain it within said groove and against the bottom 12 of said groove, which is curved about a fulcrum at said apex to permit sidewise pivotal movement of said runner within the groove.

Each of the straps 10 has threaded eyelet portions 13—13 which fit within holes in the flanges 7—7 and receive screws 14 to secure the strap to the flanges as shown in FIG. 5.

The front end of the ski is anchored to the runner by means of a cleat 15 that is located within a hole 16 in the ski and firmly secured to the runner by a U-bolt 17. Said cleat fits loosely within the hole 16 and has holding portions 18—18 overlapping marginal portions of the ski and spaced therefrom to permit sidewise pivotal sliding movement of the runner upon the ski about a fulcrum at said cleat.

In the use of said ski, the runner 9 is normally in the central position within the groove 8, as shown in FIG. 5. When the sled is steered to the right, as shown in FIG. 6, the runner will flex to the right and this will cause the front end of the ski to tip to the right and the runner to slide to the right, upon the curved bottom 12 of the axial groove, and thereby cause the ski to bank towards the right, as clearly shown in FIG. 6. The opposite will take place when the sled is steered to the left.

In the modified form shown in FIG. 11, the ski 19 is loosely fastened to the runner 9 by means of an angled strap 20 which has an apex portion 21 retaining the runner in position and permitting pivotal movement of the ski on the runner.

I claim:

1. For a sled having a flexible runner, a ski attachable to said runner, and means for fastening said ski to the runner and permitting sliding movement of the runner on the ski as the runner is flexed, the said fastening means including means anchoring the front end portion of the ski to the runner, and seperate means fastening the main portion of the ski to the runner, the said anchoring means including a cleat disposed within a hole in said ski and a U-bolt firmly securing said cleat to the runner, said cleat over-lapping marginal portions of the ski and permitting pivotal sidewise movement of the runner relatively to the ski.

2. For a sled having a flexible runner, a ski attachable to said runner, and means for fastening said ski to the runner and permitting sliding movement of the ski on the runner as the runner is flexed; said means comprising a strip of flexible material having a central groove to receive said runner, and flanges running along the opposite sides of said groove, the bottom of said groove being curved about a fulcrum at the top of the runner, and fastening means secured to said flanges and pivotally engaging the top of said runner and permitting sidewise movement of the runner upon said bottom of the groove and pivotal movement of the ski about said fulcrum.

3. The ski set forth in claim 2 wherein the said flanges are angled in the direction of said fulcrum and said seperate fastening means include a strap having angled portions secured to said flanges and a central apex engageable with said runner at said fulcrum.

4. For a sled having a flexible runner, a ski attachable to said runner, means for fastening said ski to the runner and permitting sliding movement of the runner on the ski as the runner is flexed, the said fastening means including means anchoring the front end portion of the ski to the runner, separate means fastening the main portion of the ski to the runner, said seperate means including a cleat disposed within a hole in said ski and a U-bolt firmly securing said cleat to the runner, said cleat overlapping marginal portions of the ski and permitting pivotal sidewise movement of the runner relatively to the ski, said seperate fastening means including a strap secured to the ski and loosely engaging the top of the runner to fasten the ski to the runner.

* * * * *